US012129951B2

(12) United States Patent
Frederiksen et al.

(10) Patent No.: US 12,129,951 B2
(45) Date of Patent: Oct. 29, 2024

(54) QUICK CONNECTOR

(71) Applicant: COOPER-STANDARD AUTOMOTIVE INC, Northville, MI (US)

(72) Inventors: Stephen S. Frederiksen, Clarkston, MI (US); Tisiphone A. Titus, Warren, MI (US); Kenneth Gocha, Flint, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 148 days.

(21) Appl. No.: 17/889,634

(22) Filed: Aug. 17, 2022

(65) Prior Publication Data

US 2023/0096609 A1 Mar. 30, 2023

Related U.S. Application Data

(60) Provisional application No. 63/247,796, filed on Sep. 23, 2021.

(51) Int. Cl.
*F16L 37/12* (2006.01)
*F16L 37/088* (2006.01)

(52) U.S. Cl.
CPC ....... *F16L 37/1225* (2013.01); *F16L 37/0885* (2019.08)

(58) Field of Classification Search
CPC ............... F16L 37/1225; F16L 37/0885; F16L 37/0841; F16L 37/0985; F16L 37/084; F16L 37/144
See application file for complete search history.

(56) References Cited

U.S. PATENT DOCUMENTS

| | | | |
|---|---|---|---|
| 4,643,466 A * | 2/1987 | Conner | |
| 5,683,117 A * | 11/1997 | Corbett | F16L 37/0885 |
| 9,816,658 B2 | 11/2017 | Ishizaka et al. | |
| 9,915,388 B2 | 3/2018 | Hatanaka | |
| 10,323,782 B2 | 6/2019 | Hatanaka | |
| 10,502,354 B2 | 12/2019 | Terada et al. | |
| 10,927,992 B2 * | 2/2021 | Oberdörfer | F16L 37/0885 |
| 2001/0043833 A1 * | 11/2001 | Bahner | F16L 37/0885 |
| 2003/0137148 A1 * | 7/2003 | Andre | F16L 37/084 |
| 2006/0082145 A1 * | 4/2006 | Steveley | F16L 37/144 |
| 2010/0219629 A1 * | 9/2010 | Kerin | F16L 37/0885 |
| 2012/0199222 A1 | 8/2012 | Sullivan et al. | |

(Continued)

FOREIGN PATENT DOCUMENTS

CN 104295837 A * 1/2015

OTHER PUBLICATIONS

CN-104295837-A—Machine Translation—English (Year: 2015).*

*Primary Examiner* — William S. Choi
(74) *Attorney, Agent, or Firm* — Paschall & Associates, LLC; James C. Paschall; Anthony Miologos

(57) ABSTRACT

A quick connector includes a coupler fluidically connected by a passage to a first fluid tube. A retainer housing in axial alignment with the passage is installed on the coupler and a movable retainer is installed in the retainer housing in a first position. A second fluid tube having a raised bead formed proximate an end portion of the second fluid tube is permitted to be installed into the retainer housing cavity by the retainer when the retainer is in the first position. Moving the retainer to a second position latches the bead to the retainer housing retaining the second fluid tube to the quick connector.

20 Claims, 6 Drawing Sheets

(56) References Cited

U.S. PATENT DOCUMENTS

| | | | |
|---|---|---|---|
| 2013/0082459 A1* | 4/2013 | Kaneko | F16L 37/144 |
| 2018/0328525 A1* | 11/2018 | Kerin, Jr. | F16L 37/0885 |
| 2019/0271427 A1* | 9/2019 | Zhou | F16L 37/1225 |
| 2020/0256493 A1 | 8/2020 | Kanegae et al. | |
| 2021/0199222 A1 | 7/2021 | Choo et al. | |
| 2021/0285581 A1* | 9/2021 | Rydin | F16L 37/0885 |
| 2022/0026003 A1 | 1/2022 | Kanegae et al. | |

* cited by examiner

QUICK CONNECTOR

CROSS-REFERENCE TO RELATED APPLICATIONS

This application claims priority under 35 U.S.C. § 119(e) to U.S. Provisional Patent Application No. 63/247,796 filed on Sep. 23, 2021. This provisional application is hereby incorporated by reference in its entirety.

TECHNICAL FIELD

This disclosure is generally directed to fluid connectors. More specifically, it relates to a quick connector that couples fluid carrying components.

BACKGROUND

In fluid piping in which a tube, such as a pipe or a hose, is joined to another device such as a pump, tank or another tube, a coupling connector may be used for joining the tube to the other device. Disconnect couplings, such as for example, quick connectors are frequently used for joining the tube to the other device. Quick connectors are typically comprised of two primary components or members, a receptacle or coupler having an axial fluid-flow pathway and configured to be attached to a fluid supply tube, and a plug or endform having an axial fluid-flow pathway through the endform configured or attached to another fluid receiving tube. The endform is inserted into the coupler to join the two fluid tubes and to create a single fluid-flow pathway between the tubes.

In currently known quick connectors an axially displaceable retainer is fixedly mounted within a bore of the receptacle component. The retainer may have a plurality of radially and angularly extending legs which extend inwardly toward the axial center line of the bore in the receptacle component. A tube or fitting to be sealingly mounted in the bore in the receptacle includes a radially upset portion, flange or radial bead which abuts an inner peripheral surface of the retainer legs. A fluid seal is typically mounted in the bore to form a seal between the retainer housing and the tube when the tube is lockingly engaged with the retainer legs.

It would be desirable to provide an improved fluid quick connector which has an enhanced retention capability for endforms that include a radial bead.

SUMMARY

This disclosure relates to a quick connector that couples fluid carrying components In a first embodiment, a connector is disclosed that comprises a coupler having a socket end fluidically connected by a passage to a stem connected to a first fluid tube. A retainer housing having a cavity in axial alignment with the passage is installed on the coupler socket end and a retainer is installed in the retainer housing in a first position. A second fluid tube having a raised bead formed proximate an end portion of the second fluid tube is permitted to be installed into the retainer housing cavity by the retainer when the retainer is in the first position. Installation of the second fluid tube places the bead in the retainer housing and the end portion of the second fluid tube in the coupler passage providing a fluid path between the first fluid tube and the second fluid tube. The retainer is moved to a second position that latches the bead to the retainer housing and retaining the second fluid tube to the connector.

In a second embodiment a connector for coupling a first fluid tube to a second fluid tube is disclosed. The connector includes an endform and a bead formed on an end of the second fluid tube. A coupler has a socket end fluidically connected by a passage to a stem and the stem connected to the first fluid tube. A retainer housing having a cavity in axial alignment with the passage is installed on the socket end and a retainer is installed in the retainer housing. The retainer includes first and second legs having a latch element located on each leg and first and second arms having inner surfaces arranged to grip the bead. The retainer is positioned in the retainer housing in a first position that permits the endform to be installed into the coupler socket end making a fluid connection between the first fluid tube and the second fluid tube and locating the bead in the retainer housing causing the retainer to be movable to a second position allowing the first and second arms to grip the bead and the first and second leg latch elements to clasp the retainer housing coupling the first fluid tube to the second fluid tube.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
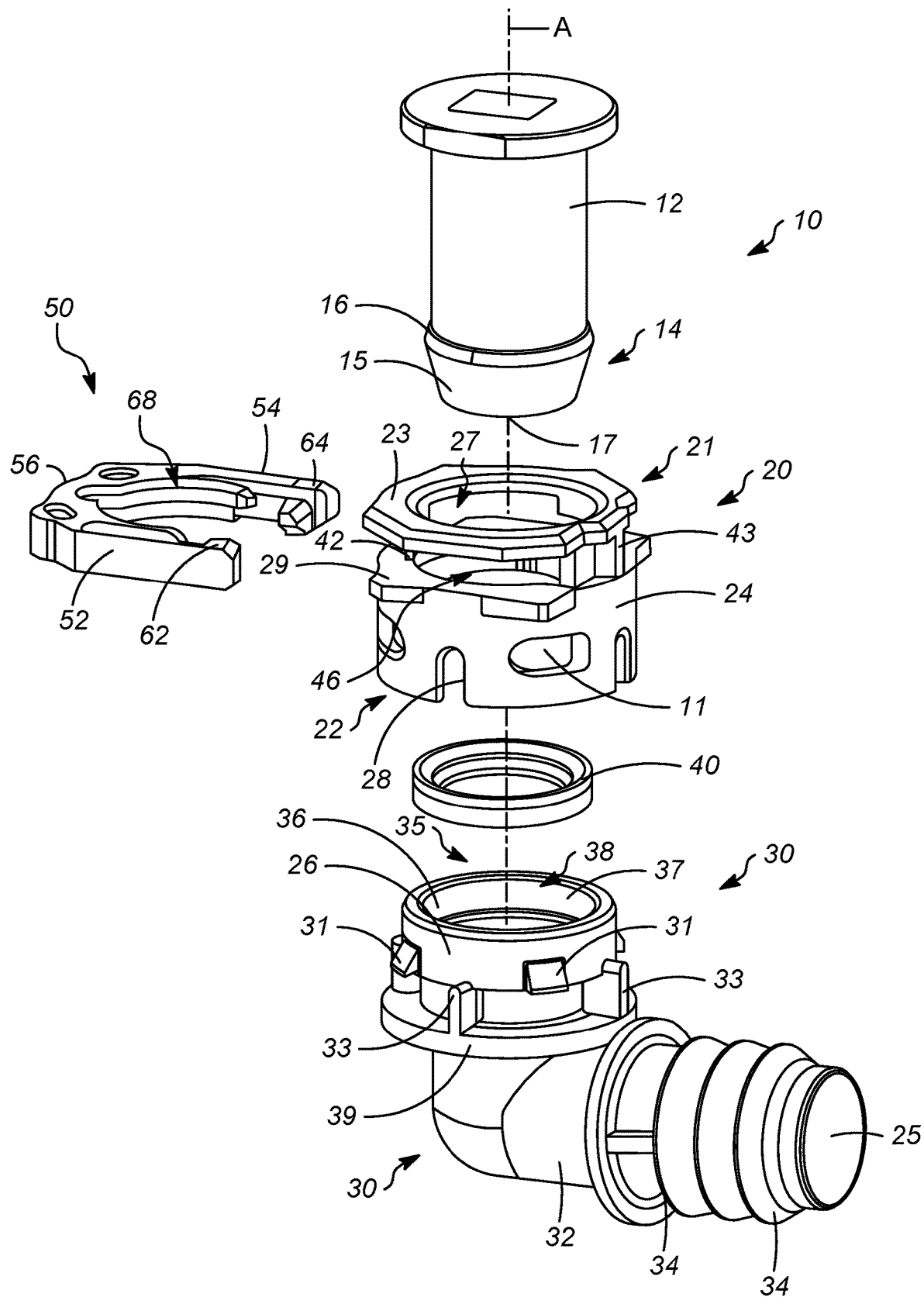
FIG. 1 illustrates an example exploded isometric view of a disassembled quick connector and receiving tube according to this disclosure.

All figures serve illustrative purposes only and are not intended to limit the scope of the present invention. The drawings are generally to scale, but some features may not be true to scale and serve to emphasize certain details of the various aspects of the invention. Common items between different embodiments of the figures have common reference numerals. It should be noted that for purposes of clarity, the quick connector of the present disclosure is shown with its longitudinal extent position in a horizontal plane and the terms "top," "bottom," have been used in describing the connector body. However, in use, the quick connector coupling can reside in any orientation without regard to the horizontal and vertical planes and "top," "bottom," "sides," and "lateral" are thus used in relation to the figures and illustrations herein.

Figure 2:
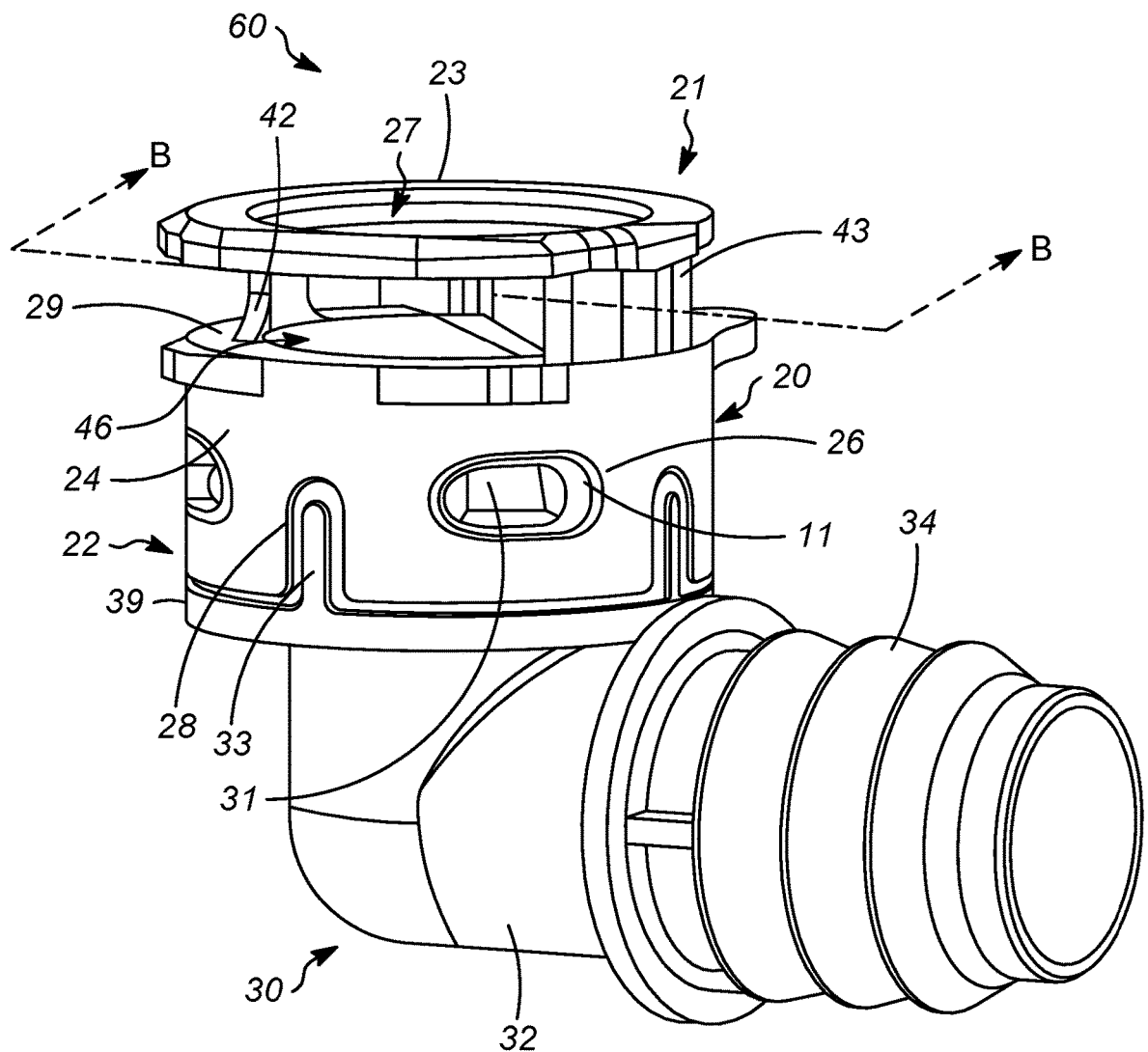
FIG. 2 is an isometric view of the retainer housing assembled on the coupler according to this disclosure.
Figure 3:
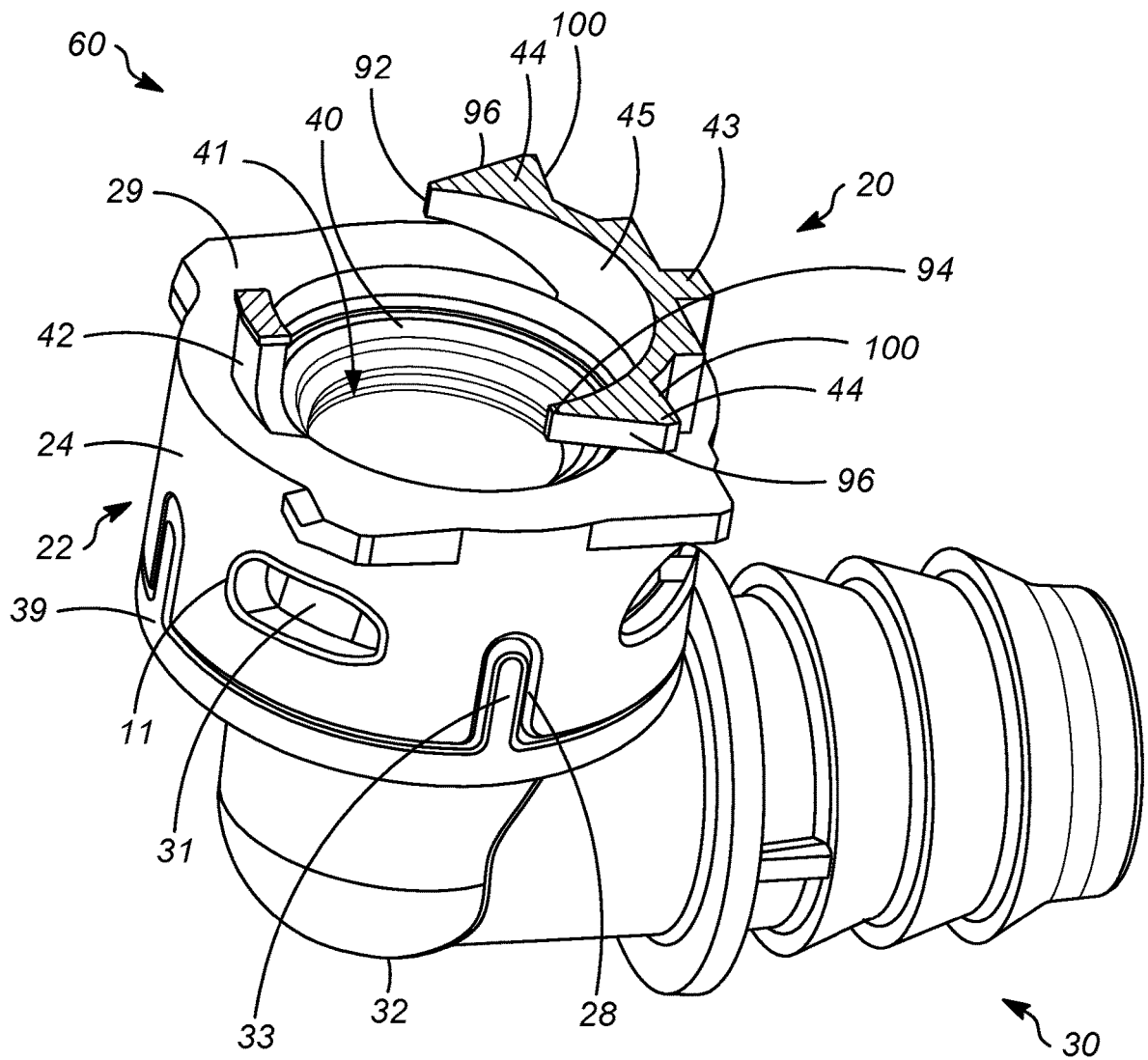
FIG. 3 is a top sectional isometric view along line B-B of the assembled retainer housing and coupler shown of FIG. 2 according to this disclosure.

Reference numeral 10 in FIGS. 1-3 illustrates an example quick connector of the present disclosure for coupling a fluid line to another fluid line. The quick connector 10 includes a retainer housing 20, a sealing member 40 a coupler 30 and a retainer 50. The quick connector 10 is used to form a fluid connection between a second fluid tube identified in this disclosure as a fluid receiving tube 12 and a first fluid tube identified in this disclosure as fluid supply tube (not shown) installed on a stem 32 of the coupler 30. The receiving tube 12 may be a pipe, a hose, or any other fluid conveying tubular component as is known in the art, that includes solid sidewalls defining an internal passage where a fluid may flow. The tube 12 includes an endform 14 formed on the end of the receiving tube 12. The endform 14 includes a ring shaped bead 16 extending outwardly from and annularly along the exterior of the receiving tube 12. A frustoconical end portion has a wall 15 tapering inwardly away from the bead 16 to an annular opening 17 at an end opposite the bead 16. The endform 14 is arranged to be accepted within the coupler 30 and along generally a longitudinal axis A, about which the quick connector 10 is arranged. The bead 16 and the frustoconical end portion 15 may be formed integrally from the material of the endform 14 during its manufacture as a unitary structure or may be constructed as a separate component bonded to the exterior of receiving tube 12.

As is illustrated in FIGS. 1-3, the coupler 30 includes a male stem 32 for mating with a fluid supply tube. The supply tube may be a pipe, a hose, or any other fluid conveying tubular component, as is known in the art that includes solid sidewalls defining an internal passage by a cylindrical internal surface. The male stem 32 may include one or more barbed flanges 34 having saw-tooth cross sections designed to bite into the inner surface of the supply tube to retain the supply tube to male stem 32 and make a fluid seal between the supply tube and the coupler 30. The coupler 30 further includes a socket end 35 leading to an internal cylindrical fluid passage 25. The socket end 35 includes an annular recess 38, comprised of walls 36 and an annular shoulder 37. An elastomeric sealing member, such as sealing member 40 is arranged to be fitted into the recess 38, as is shown in FIG. 3. The sealing member 40 is arranged to be deformable to provide a fluid seal between the wall 15 of endform 14 and the fluid passage 25 of the coupler 30.

In the present disclosure fluid from the supply tube is passed from the supply tube through the socket end 35 of the coupler 30 into the passage 25 and into the receiving tube 12 when the receiving tube 12 is installed in socket end 35. It will be well understood by those skilled in the art that the roles of the fluid conveying tubes may be reversed, for example, the receiving tube 12 may act as the supply tube supplying fluid into passage 25 of coupler 30 and the supply tube attached to the stem 32 acts as the receiving tube receiving fluid from the passage 25.

The coupler 30 further includes an annular outer wall 26 that extends about the coupler 30. A latch 31 may be fashioned on the outer wall 26 of coupler 30. In an aspect, a plurality of latches 31 may be fashioned on the outer wall 26. The latches may be rectangular and include a chamfered surface that extends obliquely outward from outer wall 26. An annular brim 39 extends about the lower periphery of outer wall 26 below latches 31. The brim 39 further includes a projection 33 extending vertically from the brim 37. In an aspect, a plurality of projections 33 may be fashioned on and located about the brim 37.

The stem 32 may extend from coupler 30 at any convenient angle applicable to the intended use of the quick connector 10. For example, the male stem 32 may extend from the socket end 35 axially as well as angularly at an oblique or alternatively an acute angle between the stem 32 and the socket end 35. In FIGS. 1-3 the coupler 30 is shown with stem 32 extending 90 degrees from socket end 35 illustrating in this disclosure an L-shaped coupler 30. However, as is mentioned above, other coupler orientations may be used to practice the disclosure.

The retainer housing 20 has a mating end 22 with an annular outer wall 24 extending about the periphery of the retainer housing 20 on a lower end. An opening 11 is located on the outer wall 24 extending through the outer wall. Additionally, the outer wall 24 includes a projection receiver 28 adapted to receive therein an associated projection 33 when the retainer housing 20 is installed on socket end 35 of coupler 30. In an aspect, a plurality of openings 11 and a plurality of projection receivers 28 may be fashioned along various locations about the periphery of outer wall 24 of mating end 22.

The retainer housing 20 joins with the socket end 35 of the coupler 30 to assemble into a receptacle 60 of quick connector 10. The mating end 22 of the retainer housing 20 is arranged to be inserted over the outer wall 26 of the socket end 35 of coupler 30. The assembly of the retainer housing 20 to socket end 35 is made by aligning a projection 33 with an associated projection receiver 28 and the connector body 20 forced downward toward brim 39 to allow the chamfered portions of latches 31 to ride against the inside surface of the outer annular wall 24 until they are received within an associated opening 11, creating a snap-fit mechanical connection between the mating end 22 of the retainer housing 20 and socket end 35 of the coupler 30. The mating end 22 of retainer housing 20 rests on brim 39 when the retainer housing 20 is fully inserted on the socket end 35. The coupler 30 and the retainer housing 20 may be separately molded of a thermoplastic material such as polyamide or polyphthalamide.

The retainer housing 20 can be mated to the coupler 30 in a plurality of relative mounting orientations. A plurality of openings 11 and latches 31 are located equidistant from each other around the periphery of the retainer housing 20 outer wall 24 and the socket end 35 outer wall 26, respectively. In other words, the latches 31 and openings 11 are at equivalent radial positions. Accordingly, the retainer housing 20 is adaptable to be mated to the coupler 30 in a plurality of orientations. Additionally, the projections 33 are located on the brim 39 at relative radial orientations, further facilitating the mating of the retainer housing 20 in a plurality of orientations. In the example receptacle 60 illustrated in FIGS. 2-3, the openings 11 and projection receivers 28 in the mating end 22 of the retainer housing 20 are at four equidistant locations 90 degrees from the other. The latches 31 and projections 33 on socket end 35 are also at four equidistant locations 90 degrees from each other. Due to the orientation of the latches 31 and openings 11 as well as the projections 33 and projections receivers 28, the coupler 30 and retainer housing 20 are adaptable to be mated together in four different orientations. It will be well understood by those skilled in the art that other configurations of openings 11 to latches 31 and projections 33 to projection receivers 28 may be used to provide other mounting orientations of the retainer housing 20 to the coupler 30. Advantageously, only a single set of tooling needs be fabricated to provide a quick connector 10 usable in different mounting orientations.

The retainer housing 20 illustrated in FIGS. 1-3 further includes an endform accepting portion 21 that extends axially above the mating end 22. The endform accepting portion 21 includes a planar flange member 23 and an annular opening 27 centrally located on flange member 23 that allows access to the interior cavity 41 of mating end 22. The opening 27 is sized to accept therethrough the endform 14 and bead 16 allowing the endform 14 to be passed into retainer housing 20 and into socket end 35 of coupler 30.

The flange member 23 is supported above the mating end 22 of retainer housing 20 by a first supporting member 42 that extends upward from a top surface 29 adjacent a first peripheral edge of the interior cavity 41. A second supporting member 43 is located adjacent a second peripheral edge of the interior cavity 41 opposite the first supporting member 42.

The flange member 23 extends over top surface 29 in a parallel orientation between first and second supporting members 42 and 43. A U-shaped opening 46 is formed between the flange member 23 and top surface 29 extending from the exterior of the retainer housing 20 to the interior cavity 41. The retainer 50 is arranged to be accepted within opening 46. The retainer housing 20, the supporting members 42 and 43 and flange member 23 are all molded of a thermoplastic material such as polyamide or polyphthalamide as a unitary structure.

FIG. 3 illustrates in an isometric sectional view of the receptacle 60 along line B-B of FIG. 2 that removes flange member 23 so as to expose the structure of the first supporting member 42 and the second supporting member 43. The second supporting member 43 is generally T-shaped extending upward from the top surface 29 of the mating end 22. A pair of clasping handles 44 extend from either side of the second supporting member 43. An arcuate interior wall 45 extends between the pair of clasping handles 44.

Figure 4:
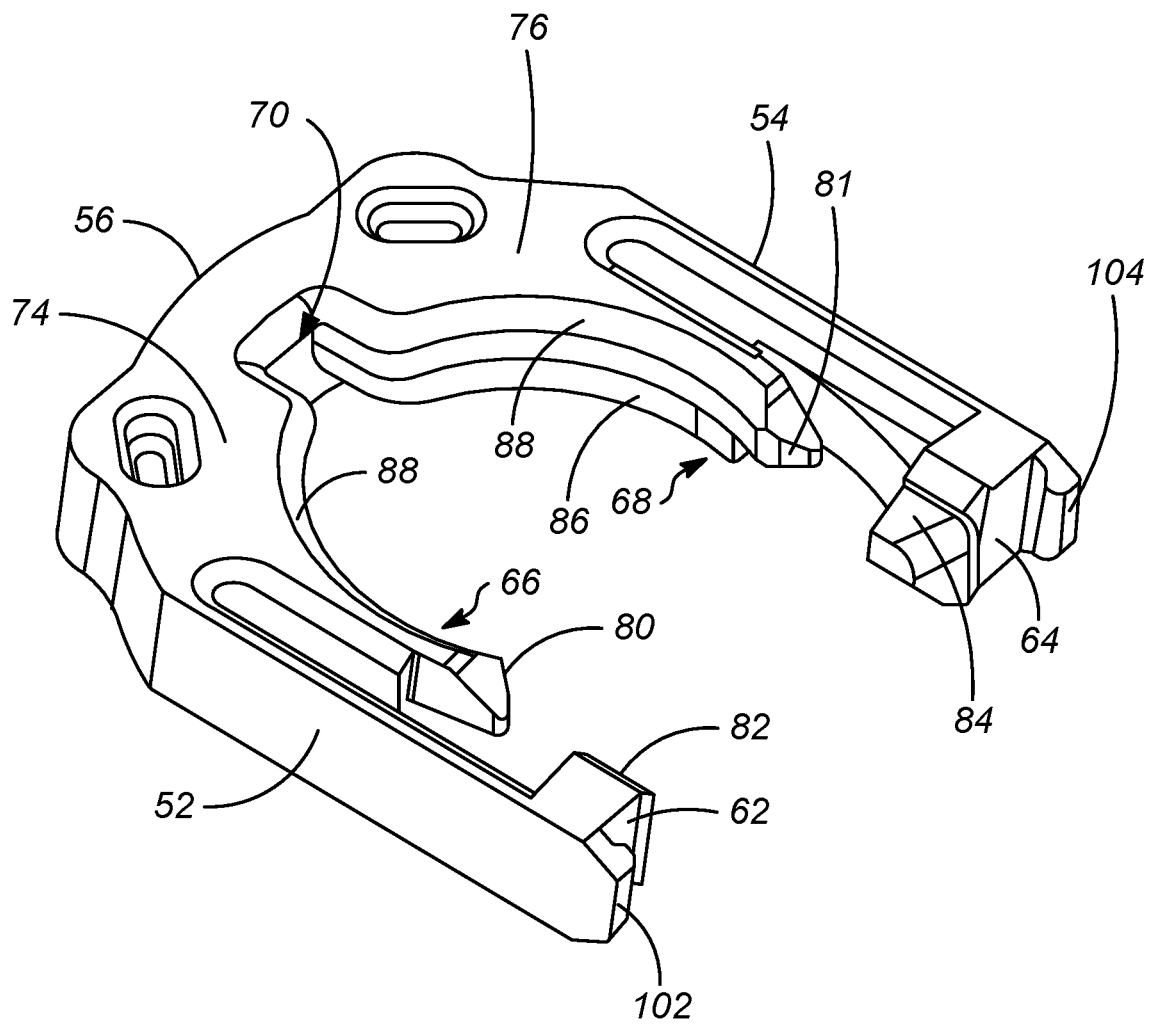
FIG. 4 is an isometric view of the retainer according to this disclosure.

FIGS. 1, 4 and 7, illustrate the retainer 50 of the present disclosure which functions to releasably latch the endform 14 and tube 12 in the retainer housing 20. The retainer 50 is typically constructed as a one piece, unitary body formed of a thermoplastic material such as polyamide or polyphthalamide. The retainer 50 includes a first leg 52 and a second leg 54 extending parallel to the other outward from an end wall 56. An end portion of each leg 52 and 54 includes a latch element 62 and 64 in the form of an inwardly extending finger projecting laterally inward from an inner surface of each side leg 52 and 54, respectively. The latch elements 62 and 64 are arranged to position the retainer 50 in a first preassembly position. In the first preassembly position, the retainer 50 is installed in the U-shaped opening 46 of the retainer housing 20, having latch elements 62 and 64 positioned such that they extend into the retainer housing 20 through opening 46 adjacent a peripheral edge of cavity 41. The retainer 50 is installed until a front surface of each latch elements 62 and 64 abuts against an edge 92 of each clasping handle 44 of the retainer housing 20. The edges 92 acting as a stop member positioning retainer 50 latch elements 62 and 64 in the first preassembly position.

First and second arcuate inner arms 66 and 68 are disposed laterally inward of the legs 52 and 54, respectively. The inner arms 66 and 68 are interconnected to and extend laterally from opposite sides of a notch 70. The notch 70 is oriented parallel to end wall 56 of the retainer 50 and is further interconnected to the inner arms 66 and 68 by the webs 74 and 76, respectively. A first inner surface 88 is formed on an upper portion of each of the inner arms 66 and 68. The diameter of the first inner surface 88 between opposed portions of the inner arms 66 and 68 is slightly larger than the outer diameter of the tube 12 above bead 16. A second inner surface 86 is formed on a lower portion of each of the arms inner 66 and 68. The second inner surface 88 having a concave face along each inner arm 66 and 68 that has an opposed outer surface curvature and diameter that is the same as the convex outer surface curvature and diameter of the bead 16 which can be best seen in in the section drawing of FIG. 6.

The inner opposed diameter spacing between the inner arms 66 and 68, in particular the diameter of the first inner surface 88 is also smaller than the outer diameter of the tube 12. Inadvertent movement of the retainer 50 from the first preassembly position to a second latched position shown in FIG. 5, prior to insertion of the endform 14 into the retainer housing 20, will cause the inner arms 66 and 68 to block insertion of the endform 14 into socket end 35 of coupler 30. Only when the retainer 50 is in the first preassembly position with the latch elements 62 and 64 positioned along the peripheral edge of cavity 41 and stopped against edges 92 and 94 can the endform 14 be fully inserted into the socket end 35 of coupler 30.

Figure 6:
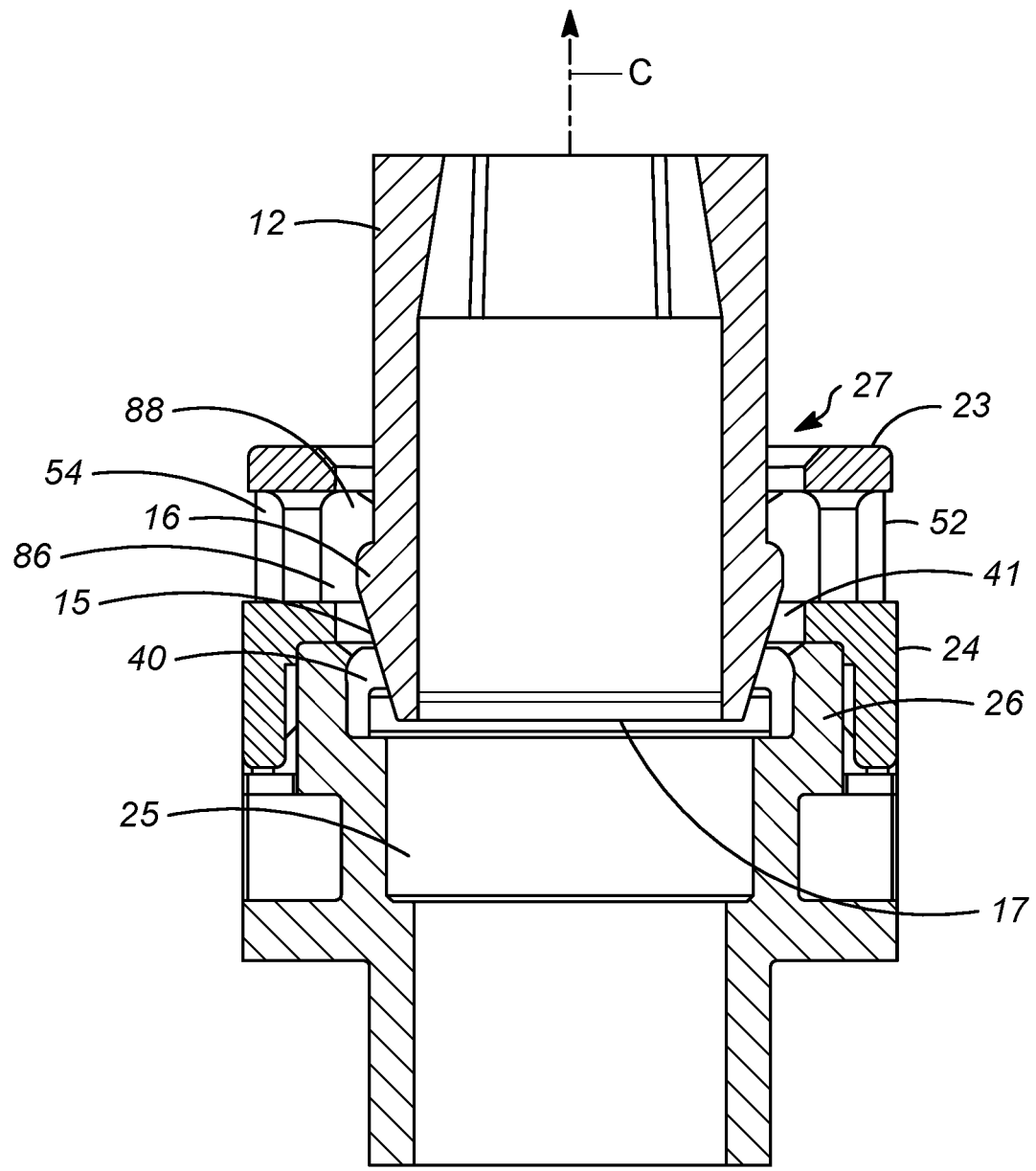
FIG. 6 is a front sectional view of the assembled quick connector and receiving tube according to this disclosure.

Insertion of the endform 14 is made with the retainer 50 in the first preassembly position. The endform 14 is inserted through opening 27 of the retainer housing 20. The latch elements 62 and 64 in their relaxed configuration, extend into opening 46 and are positioned at a peripheral edge of cavity 41 at approximately the mid-point of the cavity 41. An axial downward movement of the tube 12 into retainer housing 20 causes endform 14 and wall 15 to contact inclined surfaces 82 and 84 of latch elements 62 and 64, respectively. Each surface 82 and 84 inclines downward allowing wall 15 of the endform 14 to laterally flex legs 52 and 54 outward out of opening 46. Upon the outward displacement of legs 52 and 54 each latch element 62 and 64 moves away from its respective edges 92 allowing the endform 14 to be accommodated into socket end 35. As shown in FIG. 6 when endform 14 is fully inserted into socket end 35 the sealing member 40 squeezes around the wall 15 of endform 14 to prevent leakage of fluid to the exterior of the quick connector 10.

Figure 5:
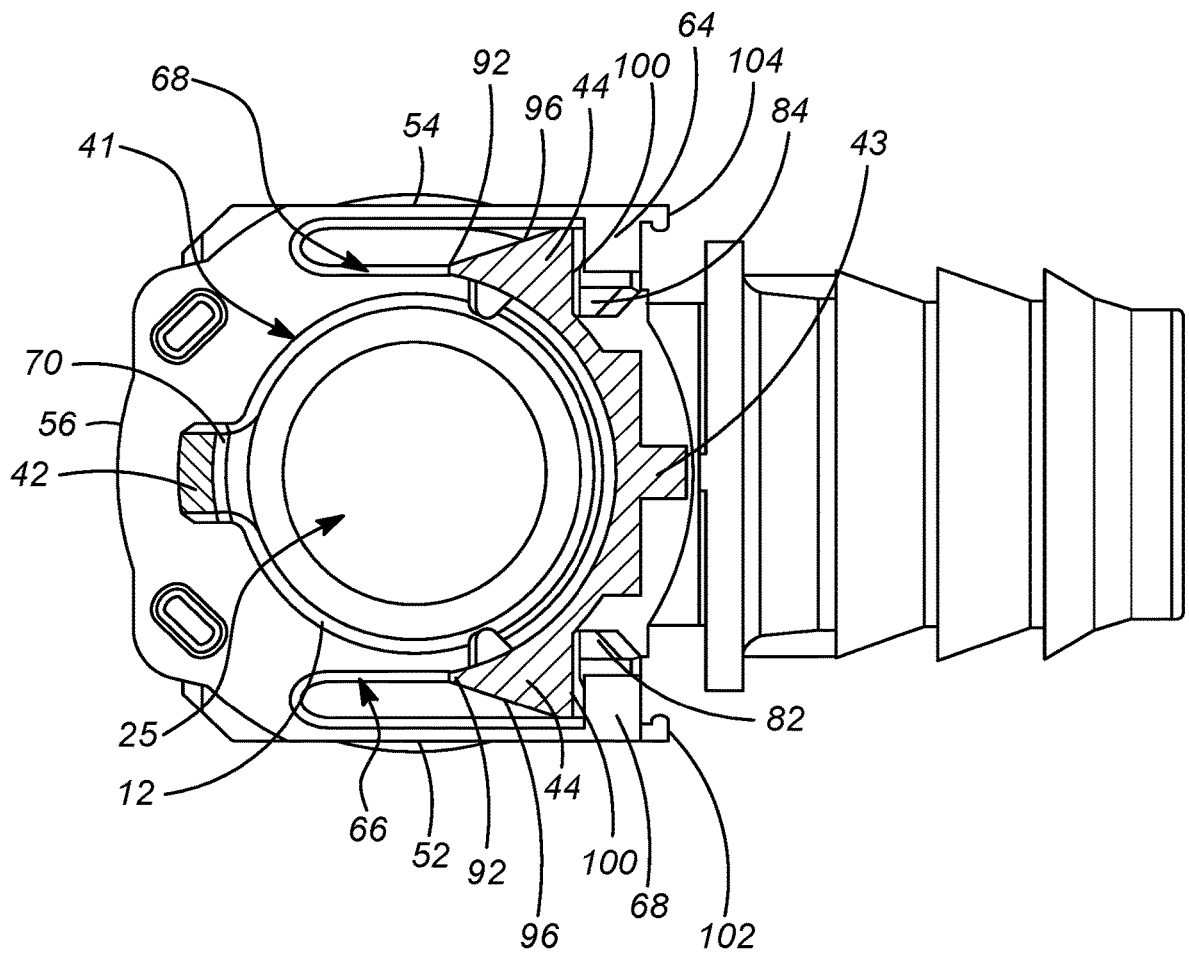
FIG. 5 is a top sectional view along line B-B of the assembled quick connector illustrating the latching of the retainer to the retainer housing according to this disclosure.

At this time, the retainer 50 can be displaced from the first preassembly position to latch the endform 14 to the retainer housing 20, by moving the retainer 50 laterally, that is toward the installed endform 14, causing the ends 80 and 81 of the inner arms 66 and 68 to initially flex outward about the outer diameter of the tube 12. The second lower surface 86 of each inner arm 66 and 68 engages the bead 16 of the endform 14. Further movement of the retainer 50 causes the latch elements 62 and 64 to travel across a chamfered surfaces 96 of a respective first and second clasping handle 44. As the latch elements 62 and 68 travel across the chamfered surfaces 96 first and second legs 52 and 54 flex further outward of opening 46 until each latch element 62 and 68 falls-off its respective chamfered surface 96 to assume a relaxed configuration proximate engaging walls 100 of the first and second clasping handles 44 preventing the retainer 50 from being pulled out of retainer housing 20, as can be seen in FIG. 5.

At this time support member 42 of retainer housing 20 enters into notch 70 of the retainer 50 preventing any further lateral movement of the retainer 50, thereby establishing the second latched position. As shown in FIG. 6, in the second latched position, the upper surfaces 88 of each inner arm 66 and 68 grips the tube 12 just above bead 14 and the concave lower surface 86 of each inner arm 66 and 68 grips the exterior convex surface of bead 16 thereby retaining the endform 14 from being pulled axially out of the retainer housing 20 in direction C. Fluid can flow between the supply tube attached to stem 32 into cavity 25 of the coupler 30 and into receiving tube 12 or vice-versa.

Decoupling the endform 14 from the retainer housing 20 can be made by moving the retainer 50 back to the first preassembly position. Fingers 102 and 104 at end portions of the legs 52 and 54, respectively can be manually manipulated by hand, or with a tool, to flex each leg 52 and 54 laterally outward until latches 62 and 64 clear surfaces 100 of each clasping handle 44 and to rest on chamfered surfaces 96 when pulled slightly back. The retainer 50 is then pulled further away from the endform 14 until latches 62 and 64 again engage edges 92 positioning the retainer 50 in the first preassembly position. In the first preassembly position the tube 12 and bead 16 of endform 14 will be clear of arms inner 66 and 68 of the retainer 50 allowing the tube 12 to be extracted axially out of the retainer housing 20 in direction C thereby separating the tube 12 from the retainer housing 20.

While the following is described in conjunction with specific embodiments, it will be understood that this description is intended to illustrate and not limit the scope of the preceding description and the appended claims.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connector comprising:
   a coupler having a socket end fluidically connected by a passage to a stem the stem connected to a first fluid tube;
   a retainer housing installed on the socket end, the retainer housing including a cavity in axial alignment with the passage;
   a retainer installed in the retainer housing in a first position;
   a second fluid tube having an end portion formed by an annular wall that tapers inwardly away from a raised bead to an annular opening, the second fluid tube permitted to be installed into the retainer housing cavity by the retainer when the retainer is in the first position placing the bead in the retainer housing and the second fluid tube end portion in the coupler passage providing a fluid path between the first fluid tube and the second fluid tube and wherein the retainer is movable to a second position that latches the bead to the retainer housing retaining the second fluid tube to the connector.

2. The connector of claim 1, wherein the raised bead and the end portion are formed as a unitary structure on an end of the second fluid tube or alternatively as a separate unitary structure bonded to the second fluid tube.

3. The connector of claim 2, wherein the annular opening is in fluid communication with the coupler passage when the second fluid tube is installed in the coupler.

4. The connector of claim 3, wherein the coupler socket end includes an annular recess, the recess having an elastomeric sealing member fitted into the recess, the sealing member arranged to be deformable about the annular wall of the second fluid tube to provide a fluid seal between the retainer housing and the passage when the second fluid tube end portion is installed in the coupler.

5. The connector of claim 2, wherein the second fluid tube bead is ring shaped extending outwardly from and annularly along an exterior of the second fluid tube.

6. The connector of claim 5, wherein the retainer housing includes an opening and the retainer includes a first leg and a second leg extending parallel to the other outward from an end wall each leg parallel to the retainer housing opening, each first and second leg having a latch element projecting laterally inward from an inner surface of each first and second leg, wherein the first and second legs latch elements are arranged to position the retainer in the first position.

7. The connector of claim 6, wherein the retainer further includes first and second arcuate inner arms disposed laterally inward of the first and second legs, the inner arms interconnected to and extend laterally from the end wall of the retainer, each arm including a first inner surface having an inner diameter between opposed portions of the inner arms larger than the outer diameter of the second fluid tube above the bead and second inner surface having a concave face along each inner arm that has an opposed outer surface curvature and diameter that is the same as the outer surface curvature and diameter of the bead.

8. The connector of claim 7, wherein in the first position the second fluid tube is permitted to be installed into the retainer housing cavity by traversing through the retainer first and second arms first inner surfaces to outwardly deflect each retainer arm and each leg out of the retainer housing opening placing the bead in alignment with the retainer second inner surface.

9. The connector of claim 8, wherein the retainer in the second position causes the second inner surface of each inner arm to engage the bead latching the bead to the retainer housing and each first and second leg latch element to be retained by a clasping handle of the retainer housing.

10. The connector of claim 9, wherein the second fluid tube is not permitted to be installed in the retainer housing cavity when the retainer is in the second position by the retainer first and second arms first inner surfaces.

11. The connector of claim 1, wherein coupler includes an annular outer wall that extends about the coupler and a plurality of latches fashioned equidistantly about the annular outer wall, each latch including a chamfered surface that extends obliquely outward from the annular outer wall.

12. The connector of claim 11, wherein the retainer housing includes a mating end having annular outer wall extending about the periphery of the mating end, the retainer housing outer wall having a plurality of openings extending through the retainer housing outer wall each opening arranged to accept the chamfered surface of a respective latch of the plurality of latches of the coupler therein retaining the retainer housing to the coupler.

13. The connector of claim 1, wherein the coupler male stem includes one or more barbed flanges having saw-tooth cross sections designed to bite into an inner surface of the first fluid tube to retain the first fluid tube to male stem and make a fluid seal between the first fluid tube and the coupler.

14. A connector for coupling a first fluid tube to a second fluid tube comprising:
   an endform formed on the second fluid tube, the endform having a frustoconically shaped end portion that tapers inwardly away from a raised bead to an annular opening;
   a coupler having a socket end fluidically connected by a passage to a stem, the stem connected to the first fluid tube;
   a retainer housing installed on the socket end, the retainer housing including a cavity in axial alignment with the passage adapted to receive the endform and the bead;
   a retainer installed in the retainer housing, the retainer having first and second legs having a latch element located on each leg and first and second arms each arm having inner surfaces fitted to grip the bead;
   wherein the retainer is positioned in the retainer housing in a first position that permits the endform to be installed into the coupler socket end making a fluid connection between the first fluid tube and the second fluid tube and locating the bead in the retainer housing causing the retainer to be movable to a second position allowing the first and second arms to grip the bead and the first and second leg latch elements to clasp the retainer housing, coupling the first fluid tube to the second fluid tube.

15. The connector of claim 14, wherein the annular opening is in fluid communication with the coupler passage when the second fluid tube is installed in the coupler.

16. The connector of claim 15, wherein the coupler passage includes an annular recess, the recess having an elastomeric sealing member fitted into the recess, the sealing member arranged to be deformable about the second fluid tube wall to provide a fluid seal between the retainer housing and the passage when the second fluid tube end portion is installed in the coupler.

17. The connector of claim 14, wherein coupler includes an annular outer wall that extends about the coupler and a plurality of latches fashioned equidistantly about the annular outer wall, each latch including a chamfered surface that extends obliquely outward from the annular outer wall.

18. The connector of claim 17, wherein the retainer housing includes a mating end having an annular outer wall extending about the periphery of the mating end, the retainer housing outer wall having a plurality of openings extending through the retainer housing outer wall each opening arranged to accept the chamfered surface of a respective latch of the plurality of latches of the coupler therein retaining the retainer housing to the coupler.

19. The connector of claim 14, wherein the retainer housing includes an opening extending through the retainer housing located parallel to each retainer first and second leg and wherein in the first position the endform is permitted to be installed into the retainer housing cavity allowing the endform end portion to traverse through the retainer first and second arms causing each of the first and second arms to deflect each first and second legs outward out of the retainer housing opening, positioning the bead in alignment with the first and second arms to be gripped by the first and second arms when the retainer is positioned into the second position.

20. The connector of claim 19, wherein the retainer housing further includes a clasping handle and in the second position each first and second leg deflects inward from the retainer housing opening engaging the first and second legs latch elements to the clasping handle clasping the retainer to the retainer housing.

* * * * *